United States Patent Office 3,498,828
Patented Mar. 3, 1970

3,498,828
CURING OF AIR-INHIBITED MONOMER
LAMINATES
Augustus B. Small, Westfield, N.J., assignor to Esso Research and Engineering Company, a corporation of Delaware
No Drawing. Filed Aug. 30, 1965, Ser. No. 483,839
Int. Cl. B44d 1/09; C09d 3/48
U.S. Cl. 117—126                                       12 Claims

ABSTRACT OF THE DISCLOSURE

An improved thermosetting composition and a process for preparing said composition which comprises adhering a layer of thermosetting polyester resin to the surface of a laminate comprising a reinforcing element and a resinifiable mix comprising a monovinyl aromatic compound, a polyolefinic compound, a rubbery polymer and a free radical initiator and curing said adhered layers while in contact with one another.

---

This invention relates to a method for increasing the cure rate of a thermosetting vinyl aromatic resin and to the compositions produced thereby. In particular, this invention relates to a method of improving the surface cure and physical condition of a thermosetting vinyl aromatic resin laminate. More particularly, this invention relates to a composition prepared by adhering a thin layer of a thermosetting polyester resin to the surface of a thermosetting vinyl aromatic resin laminate.

It is known in the art that vinyl aromatics, such as styrene, can be homopolymerized to useful plastic materials. It is also known to prepare reinforced plastic materials by suspending glass fibers in monomeric vinyl aromatics, such as styrene, and polymerizing the mixture in conjunction with agitation. Vinyl aromatics have also been copolymerized with cross-linking agents, such as polyvinyl aromatic hydrocarbons, e.g., divinyl benzene, in the absence of reinforcing fibers. It has further been proposed to add reinforcing elements, e.g., glass fibers; thickening agents, such as high molecular weight rubbery materials; and an unsaturated silane to the aforementioned vinyl aromatic—polyvinyl aromatic mixtures in order to prepare finished articles or structures of a vinyl aromatic reinforced plastic. See co-assigned U.S. Patent No. 3,301,739. These resinous mixtures are suitable and readily adaptable to the hand lay-up method of impregnation for forming structural and other useful articles and shapes. In addition, new catalyst systems have recently been proposed for said resinous mixtures which permit curing at room temperature.

Among the difficulties encountered when utilizing the aforementioned type of resinifiable mix are those of air inhibition and evaporation. When exposed to the air, the length of time required to cure the resinifiable mix to a hard structure is substantially increased. Often, several days are required for a complete cure; in contrast, an air-excluded sample can be cured in as little as 16 hours. The substitution of other gaseous inert atmospheres about the surface of the resin does not substantially improve the cure rate. In addition to the inhibited cure rate, the resinifiable mix is characterized by a high vapor pressure which is manifested by a high rate of evaporation. Thus, in the case of a reinforced resin, the upper layers of the reinforcing element are often left completely dry and exposed. These exposed layers are, thus, subject to delamination. While both of these difficulties can be substantially eliminated by the use of high temperatures, pressures and enclosed molds, such process conditions are obviously expensive and serve to increase the cost of the articles being manufactured. Utilization of this type of resin by the plastics and resin industries, as well as their customers, has faltered due to the absence of a suitable method for curing said resins at room temperature, which method eliminates the difficulties associated with air inhibition and resin evaporation.

It has now been found that the aforementioned problems of air inhibition and resin evaporation can be substantially eliminated by superimposing a thin layer of a thermosetting polyester resin upon the surface of the preformed resinifiable mix. The polyester resin shields the resinifiable mix from the surrounding air and not only prevents air inhibition but also prevents volatilization of the resin. Furthermore, because the polyester resin is a faster-curing resin, the heat of reaction evolved during the curing of the polyester resin is added to the heat of reaction of the resinifiable mix. This additive effect provides a faster and more efficient cure of the resinifiable mix.

The exact nature and objects of the instant invention will be more clearly perceived and more fully understood by referring to the following description and claims.

The resinifiable formulations utilized in the preparation of the present compositions are comprised primarily of a vinyl aromatic monomer and a cross-linking agent. Thickening agents can also be added to the resinifiable mix in order to control its viscosity. Free radical generators, such as organic peroxides and hydroperoxides, are utilized to initiate and maintain polymerization. In addition, promoters which accelerate the decomposition of the free radical generators can also be used to initiate polymerization at room temperature. If a reinforcing element is used, a coupling agent, which provides a bond between the resin and reinforcing element, can also be used.

In general, the vinyl aromatic compound utilized to prepare the resinifiable mix of the present method is styrene or a homolog thereof. These compounds can be represented by the following structural formula:

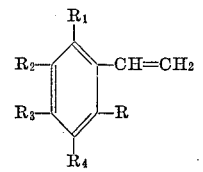

wherein $R_1$, $R_2$, $R_3$, $R_4$, and $R_5$ may be the same or different and are, therefore, independently selected from the group consisting of hydrogen, halogens, and $C_1$–$C_{18}$ alkyls, preferably $C_1$–$C_4$ alkyls. The vinyl aromatic compound, in general, comprises between about 70 and about 99.5 parts, per 100 parts, of the total resinfiable mix.

Suitable examples of vinyl aromatic compounds include: styrene, ortho-methyl styrene, meta-methyl styrene, para-methyl styrene, ortho-ethyl styrene, para-ethyl styrene, 2,4-dimethyl styrene, 2,3-dimethyl styrene, 2,5-dimethyl styrene, para-tertiary-butyl styrene, ortho-chlorostyrene, meta-chlorostyrene, para-chlorostyrene, 2,4,6-trichlorostyrene, mono-, di-, and trifluorostyrenes, 1,4-diethyl styrene, 1-methyl-4-chlorostyrene, meta-bromostyrene, ortho-bromostyrene, para-bromostyrene, 2,4-dichlorostyrene, 2,5-dichlorostyrene, 2,6-dichlorostyrene, dibromostyrene, ortho-pentyl styrene, meta-octyl styrene, para-dodecyl styrene, meta-octadecyl styrene and mixtures thereof. Preferred vinyl aromatic compounds include styrene and chlorostyrene.

It is also within the purview of this invention to incorporate in the resinifiable mix between about 0 and about 15 parts, preferably between about 0.5 and about 5.0 parts, of a high molecular weight rubbery polymer, per 100 parts of resinifiable mix. The rubbery polymer serves to adjust the viscosity of the mix to any desired value. Suitable examples of high molecular weight rubbery polymers include: polybutadiene, butadiene copolymers, natural rubber, polyisoprene, butadiene-styrene rubber, butadiene-acrylonitrile rubber, and the like. Natural rubber, such as the so-called pale crepe grade, is preferred. In general, the viscosity average molecular weight of these rubbers will be between about 200,000 and about 2,000,000. High molecular weight plastics of at least 200,000 viscosity average molecular weight can be used in place of the aforementioned rubbery polymers. Polystyrene, prepared by emulsion polymerization and which has a viscosity average molecular weight of at least 1,000,000 is particularly applicable. It is also possible to include fillers, such as divided silicas, glasses, clays such as bentonite, and carbon blacks into the mix. Such materials serve to adjust viscosity as well as to impart other valuable characteristics.

In addition to the vinyl aromatic compound and thickening agent, a polyolefinic compound is also incorporated into the resinifiable mix in order to serve as a cross-linking agent for the polymeric vinyl aromatic units. The polyolefinic compounds which can be utilized generally include: polyolefinic aromatic compounds, such as divinyl aromatics and $C_3$–$C_6$ dialkenyl aromatics; glycol esters of $C_3$–$C_{10}$ unsaturated carboxylic acids; and vinyl and/or allyl esters of $C_3$–$C_{12}$ polycarboxylic acids, e.g., dicarboxylic acids. The glycols, which are reacted with the unsaturated carboxylic acids, can have from 2 to 6 carbon atoms and from 2 to 6 hydroxyl groups attached thereto. The polyolefinic compounds are utilized in an amount of between about 0.5 and about 10 parts, per 100 parts of resinifiable mix; but, preferably, are incorporated in an amount of between about 1 and about 3 parts, per 100 parts of resinifiable mix.

Suitable examples of cross-linking agents include: divinyl benzene, divinyl toluene, divinyl xylene, divinyl naphthalene, trivinyl benzene, diisopropenyl benzene, diallyl phthalate, triallyl acetyl citrate, triallyl cyanurate, divinyl phthalate, diallyl fumarate, vinyl methacrylate, allyl methacrylate, ethylene glycol dimethacrylate, diethylene glycol diacrylate, propane triol trimethacrylate, polyethylene glycol dimethacrylate, diallyl maleate, butyl glycol dimethacrylate and bicycloheptene. Preferred cross-linking agents include: divinyl benzene and ethylene glycol dimethacrylate.

A free radical generator is incorporated into the resinifiable mix in order to initiate polymerization of the vinyl aromatic compound. The free radical generator is generally incorporated in an amount of between about 0.1 and about 5.0 parts, per 100 parts of resinifiable mix, and preferably is utilized in an amount of between about 1.0 and about 3.0 parts, per 100 parts of mix. In general, all peroxides, hydroperoxides, per-esters and per-acids can be employed as the free radical initiator. In addition, it has been found that combinations of two or more of the aforementioned types of free radical initiators can be utilized with excellent results. See, for example, co-assigned U.S. patent application Ser. No. 334,939, where it is disclosed that the combination of a ketone or aldehyde type peroxide with two acyl peroxides produce excellent catalytic effects. The aforementioned application is incorporated herein by reference in its entirety.

Examples of suitable free radical initiators include: 2,4-dichloro benzoyl peroxide, lauroyl peroxide, methyl ethyl ketone peroxide, decanoyl peroxide, caprylyl peroxide, acetyl peroxide, benzoyl peroxide, p-chloro benzoyl peroxide, hydroxyl heptyl peroxide, bis(1-hydroxycyclohexyl) peroxide, dicumyl peroxide, cyclohexanone peroxide, and cumene hydroperoxide. Benzoyl peroxide is preferred for relatively low temperature reactions, whereas dicumyl peroxide is preferred for high temperature reactions.

It is often desirable to utilize a promoter to aid in the decomposition of the free radical initiator. This enables the polymerization of the resinifiable mix to take place at lower temperatures. Any of the conventional promoting agents known in the art can be used for this purpose. Hydroperoxides are generally activated by the presence of cobalt metal or cobalt salts, such as cobalt naphthanate, or cobalt acetoacetate $C_8$ ester, as well as amines, such as N,N'-dialkyl aniline compounds, e.g., N,N'-dimethyl aniline, and N-phenylmorpholine. In general, between about 0.1 and about 1.0 wt. percent of promoter, based on monovinyl aromatic is used to promote the decomposition of the free radical initiator.

The instant resinifiable mix, finds its greatest usefulness in the fabrication of large objects such as boat hulls, liquid storage tanks, large structural panels, and pipe of unusual length and size, where hand lay-up techniques are required and where, because of the large size of the object, it is not practical to cure the object through the use of molds, ovens or other apparatus for heating or baking with or without the use of superatmospheric pressures. For this reason, the invention finds its greatest utility in the association or impregnation of the resinifiable mix with or into fillers or reinforcing elements. It is, therefore, a preferred embodiment of the present invention to comingle such fillers or fibers with the normally liquid resinifiable mix containing the combination of the various ingredients hereinabove described.

The reinforcing elements that are applicable to this invention include fibers formed from mineral materials, e.g., glass, asbestos, mica, rock and celite; vegetable fibers, e.g., cotton, linen, rayon and silk; organic materials, e.g., hair, nylon and Orlon; and metallic filaments or wire, e.g., iron, aluminum, and copper. Reinforcing elements can comprise up to about 80%, e.g., between about 20 and about 80% by weight of the reinforced material, preferably between about 30 and about 70 wt. percent. The preferred material is glass fiber. Glass fiber includes any fibrous glass unit such as filament yarns, rovings, reinforcing mats, staple yarns, woven fabrics, chopped fibers and flake glass.

In general, the reinforcing elements are used in combination with a coupling agent which is employed to bind the reinforcing element to the polyvinyl aromatic compound. The coupling agents are specific to the reinforcing agent used and are conventionally known in the art. The coupling agents can be used to pretreat the reinforcing element utilized or can be added directly to the resinifiable mix. In the case of glass fibers, the coupling agent is usually an unsaturated compound of silicon or chromium and usually constitutes between about 0.2 and about 0.5% of the weight of the glass. Typical agents are the vinyl-silane type, which are preferred; however, a methacrylic acid complex prepared by coordination with chromium chloride is also effective. A further description of conventional coupling agents as well as a more complete disclosure of the resinifiable mix utilized in the present invention can be found in co-assigned U.S. patent application Ser. No. 295,579, which is incorporated herein by reference in its entirety.

A laminate, according to the present invention, is defined as a composite mass of a reinforcing element and a liquid monomeric mixture which has set to a hard, reinforced substance. It, therefore, includes layers of cloth and resin; fibers embedded in a resin; and fibers in the form of rovings or strands which are saturated with resin and formed in a hollow cylindrical pipe or other directionally wound object. The laminate can comprise one or more layers of the reinforcing element and resinifiable mix and, in general, will vary in thickness from between about 0.05 inch and about 0.5 inch. The bonding of the monomeric mixture to the reinforcing element can be accomplished by any known method. Furthermore, the bonded material can be set to any desired shape by hand lay-up, molding, or the like. For example, the resin mix can be combined with glass cloth by brush impregnation; by being poured into the center of several piles of dry cloth assembled on cellophane-covered glass plate; or by dipping the cloth into the resin mix.

The vinyl aromatic resin laminates of the instant invention can be cured by any known method. A suitable method is by baking in a press mold at a temperature between about room temperature and about 300° F. for between about 1 minute and about 2 hours. A postcure, if desired, may then be employed at a temperature of between about 250° F. and 400° F. for between about 1 and about 10 hours. However, as indicated hereinabove, the instant resinifiable mixes are especially applicable for hand lay-up techniques and cures at room temperature without superatmospheric pressures. Pressure, however, can be used and can vary from between about 1 p.s.i. and about 1,000 p.s.i.

In addition to the ingredients specified hereinabove, the resinifiable mix can also be modified with such materials as acrylonitrile, polyesters, methyl methacrylate and other liquid hydrocarbons containing vinyl type unsaturation. These additional ingredients can be incorporated in an amount of between about 0 and about 30 wt. percent, based on total resinifiable mix. In the case of acrylonitrile, for example, a preferred amount is between about 15 and about 30 wt. percent.

The thermosetting polyester resins of the present novel compositions are well-known in the art and are generally described in the article "Polyesters" by Edward H. Meyer, which appears in the 1965 edition of the Modern Plastics Encyclopedia, pp. 235–240. In general, polyester resins are the result of a blend of a cross-linking monomer, such as styrene, with the condensation reaction product of dibasic acids or anhydrides and diols. The thermosetting polyesters are prepared by a two-step process which comprises (1) the condensation reaction between the dibasic acid and the diol in an inert atmosphere, and (2) the blending of the resulting condensation product with the cross-linking monomer. The esterification process is generally carried out under an inert gas in a heated, stainless steel reactor fitted with an agitator until a low acid number, usually less than 50, is obtained. The resulting linear polyester is cooled and blended with the cross-linking monomer, usually styrene, at temperatures between about 100° F. and about 150° F. Inhibitors such as hydroquinone, t-butyl catechol, phenyl hydrazine hydrochloride, etc., are usually incorporated in an amount of between 0.005 and about 0.30 wt. percent in order to prevent premature addition polymerization, maintain storage stability, and to prevent premature jelling during end-use processing or handling at elevated temperatures.

The dibasic acids utilized in the esterification step can be saturated or unsaturated and include: $C_4$–$C_{18}$ dicarboxylic acids such as fumaric acid, itaconic acid, adipic acid, azaleic acid, sebacic acid, and isophthalic acid. The corresponding anhydrides of the aforementioned dibasic acids can also be employed. Suitable examples include: maleic anhydride, phthalic anhydride, and isophthalic anhydride. At least one of the acids or anhydrides utilized in the esterification step must be unsaturated in order to provide an unsaturated situs for cross-linking with the blended monomer.

The glycols with which the aforementioned disbasic acids and anhydrides are esterified can be any one of or a mixture of $C_2$–$C_6$ polyhydric alcohols, preferably the dihydric alcohols. Suitable examples include: ethylene glycol, propylene glycol, diethylene glycol, dipropylene glycol, neopentyl glycol, 1,3-butylene glycol, 1,2-propylene glycol, etc. The glycols are generally utilized in a 1:1 mole ratio with the aforementioned acids and anhydrides.

The cross-linking monomers utilized in the blend with the linear polyester can generally be defined as liquid monomers containing vinyl unsaturation. They include monovinyl aromatics, such as styrene and homologs thereof; polyvinyl aromatics, such as diallyl phthalate; $C_1$–$C_6$ alkyl esters of $C_3$–$C_{10}$ unsaturated carboxylic acids; etc. These materials have previously been described in connection with the description of the resinifiable mix. That description is applicable here and is, accordingly, incorporated herein. Especially suitable examples include styrene, vinyl toluene, diallyl phthalate, triallyl cyanurate, methyl methacrylate, and methyl acrylate. These monomers are generally used in an amount of between about 0 and about 30 wt. percent, based on polyester.

Initiation of the cross-linking of the polyester resin is performed by a free radial catalyst such as a peroxide or hydroperoxide. The free radicals provided by the decomposition of the peroxidic compound attach themselves to the double bonds in the polyester system producing a cross-linked polymeric network between the cross-linking monomer and the linear polyesters. The peroxidic compounds and amounts hereinabove described with relation to the resinifiable mix can also be utilized to initiate the polymerization of the polyester resin. Preferred free radical initiators include: benzoyl peroxide, lauroyl peroxide, cumene hydroperoxide, 2,4-dichlorobenzoyl peroxide, t-butyl perbenzonate, di-t-butyl perphthalate, t-butyl-hydroperoxide, methyl ethyl ketone peroxide, cyclohexanone peroxide and mixtures thereof.

As is the resinifiable mix system, promoters such as N,N'-dialkyl aniline compounds, cobalt metal or cobalt salts, such as cobalt naphthenate, may be utilized to promote the decomposition of the peroxidic catalyst. Cobalt salt solutions, containing about 6% cobalt, are conventionally used in an amount of between about 0.1 and about 0.5 wt. percent, based on polyester. It should be noted, however, that the peroxide catalyst utilized for the polyester resin is separate and distinct from the peroxide catalyst system utilized for the resinifiable mix. Each of the two aforementioned resin systems are likewise separate and distinct from each other.

Thus, in accordance with the procedures of the present invention, a resinifiable mix is prepared by first dissolving the desirable thickening agent in the principal vinyl aromatic, e.g., styrene. To this solution is then added a suitable quantity of the polyfunctional cross-linking agent, e.g., divinyl benzene, and a vinyl silane, which serves as a coupling agent between the ultimate resin and the glass reinforcement. Coupling agents will vary with the reinforcing element utilized. To this solution and immediately prior to use, is added the peroxide initiator. The catalyzed resinifiable mix is then used to wet the glass reinforcement, which has been preformed into the shape of the article being prepared. An unsaturated polyester, containing the desired quantity of cross-linking monomer, e.g., styrene, is prepared for use by adding thereto the peroxide initiator. The unsaturated polyester mix is then painted over the aforementioned resinifiable mix—glass reinforcement lay-up. The unsaturated polyester gels in the initial stage of cure and forms a film over the resinifiable mix lay-up (substrate) which prevents evaporation of the monomers of the resinifiable mix. The heat of reaction in the polyester surface layer speeds up the cure of the substrate layer so that a high strength integrally reinforced plastic is produced. The polyester surface layer adheres to the substrate layer and becomes an integral part of the article being prepared. Application of the layer of unsaturated polyester resin to the thermosetting vinyl aromatic reinforced resin laminate can, of course, be accomplished by any known method, such as, painting, spraying, coating, brushing, etc. The polyester resin layer is generally applied at a thickness of between about 5 and about 20 mils, preferably about 10 mils. The entire integrated structure cures in between about 2 and about 24 hours. Generally, the structure can be handled fairly easily within 2 hours. As indicated hereinabove, the present process is suitably adapted for room temperature cures, e.g., above about 60° F., although higher temperatures can be used if possible.

The inventive process is more particularly described in the following examples, which are intended as illustrative only since numerous modifications and variations therein will be apparent to those skilled in the art.

EXAMPLE 1

In order to show the utility of the vinyl aromatic resin laminate of the instant invention, a vinyl aromatic resin (V-resin) was prepared in accordance with the recipe of Table I and compared to a conventional polyester resin with regard to physical properties. Fiber glass was used as a reinforcing element in both cases. The results of these tests appear in Table II.

TABLE I

| Reactants: | Parts by weight, grams |
| --- | --- |
| Styrene | 100 |
| Pale crepe rubber | 10 |
| Ethylene dimethacrylate | 6 |
| 2,4-dichlorobenzoyl peroxide | 0.75 |
| Lauroyl peroxide | 0.5 |
| Benzoyl peroxide | 1.5 |
| Methyl ethyl ketone peroxide | 0.75 |
| Dimethyl aniline | 0.5 |
| Cobalt naphthenate (6% Co) | 0.5 |
| Vinyl silane (A-172)[1] | 0.1 |

[1] A vinyl silane ester of the monomethyl ether of ethylene glycol.

TABLE II

| | V-resin | Polyester[2] |
| --- | --- | --- |
| Barcol hardness [1] | 41 | 39 |
| Flexural strength, p.s.i. | 28,500 | 25,900 |
| Weight of resin per square foot, grams | 420 | 560 |

[1] Barcol hardness: A measure of the resistance to penetration of the sample to a sharp steel point under a constant spring loading. The higher the number, the harder the material and also the greater the degree of cure. See Polyester Resins, by John R. Lawrence, Reinhold Publishing Corp., 1960, p. 54.

[2] Polyester, general purpose polyester: The polyester component was the reaction product of ethylene propylene glycols with phthalic and maleic anhydrides. The polyester was used as a 70 wt. percent polyester and 30% styrene solution.

The data in Table II show that a reinforced laminate prepared with a vinyl aromatic resin was harder as shown by the Barcol hardness test; had a higher flexural strength; and required less resin per square foot of laminate than a conventional polyester resin laminate.

EXAMPLE 2

A vinyl aromatic—acrylonitrile resin was prepared in accordance with the recipe of Table III. A laminate was prepared consisting of various layers of fiber glass and resin in the following manner. A layer of fiber glass was first laid down on a female mold followed by the application of the resin with an ordinary paint roller. This procedure was followed until about 15 layers of resin-impregnated glass fiber had been built up. The uppermost layer of impregnated fiber was then superimposed with a thin layer (<0.25 mm.) of an isophthalic polyester sold under the trade name of Palatal A-410. This polyester is prepared from isophthalic anhydride, mixed glycols and maleic anhydride. The built-up composite structure was then permitted to cure at room temperature, i.e., 23° C., and exposed to the atmosphere until hard. It was found that the polyester resin cured rapidly and formed a barrier between the atmosphere and the layers of resin-impregnated glass fiber, thus preventing air inhibition and evaporation of the vinyl aromatic—acrylonitrile resin. The resulting vinyl aromatic reinforced resin laminate cured to a hard, strong laminate. There was no indication of evaporation as evidenced by the total lack of resin-starved areas on the uppermost layers of the laminate.

TABLE III

| Reactants: | Parts by weight, grams |
| --- | --- |
| Styrene | 70 |
| Acrylonitrile | 30 |
| Ethylene glycol dimethacrylate | 3 |
| Polyisoprene | 3.5 |
| N,N'-dimethyl aniline | 0.5 |
| Vinyl silane A-172 | 0.25 |
| Benzoyl peroxide [1] | 4.0 |

[1] 50% paste in dibutyl phthalate.

EXAMPLE 3

In accordance with the procedure of Example 2, a laminate was prepared and cured utilizing the vinyl aromatic—acrylonitrile resin of that example but without the benefit of a superimposed layer of the isophthalic polyester. Examination of the cured resin showed that it was poorly cured, friable and contained large resin-starved areas. Such a product is completely useless.

While there are above-described a number of specific embodiments of the present invention, it is obviously possible to produce other embodiments of various equivalent modifications and variations thereof without departing from the spirit of the invention. Having now set forth the general nature and specific embodiments of the present invention, the true scope is now particularly pointed out in the appended claims.

What is claimed is:

1. In a process for preparing reinforced plastic materials, which comprises preparing laminate of (1) a reinforcing element and (2) a resinifiable mix comprising:
   (a) a monovinyl aromatic compound,
   (b) a polyolefinic crosslinking compound,
   (c) a rubbery polymer, and
   (d) a free radical initiator;
the improvement which comprises superimposing on said laminate, a layer of a thermosetting polyester resin and causing the resinifiable mix and polyester layer to cure while in contact with one another.

2. The process of claim 1 wherein the reinforcing element is fiber glass.

3. The process of claim 1 wherein the monovinyl aromatic compound is selected from the group consisting of styrene and homologs thereof.

4. The process of claim 1 wherein said polyolefinic compound is selected from the group consisting of divinyl aromatics, $C_3$–$C_6$ dialkenyl aromatics, glycol esters of $C_3$–$C_{10}$ unsaturated carboxylic acids, vinyl esters of $C_3$–$C_{12}$ polycarboxylic acids, and allyl esters of $C_3$–$C_{12}$ polycarboxylic acids.

5. The process of claim 1 wherein the rubbery polymer is pale crepe rubber.

6. The process of claim 1 wherein the free radical initiator is 2,4-dichlorobenzoyl peroxide, methyl ethyl ketone peroxide, cumene hydroperoxide, or mixtures thereof.

7. The process of claim 1 wherein the rubbery polymer is selected from the group consisting of polybutadiene, butadiene copolymers, natural rubber and butadiene-acrylonitrile copolymers.

8. The process of claim 1 wherein the resinifiable mix contains about 15 to about 30 parts of acrylonitrile per 100 parts of monovinyl aromatic.

9. The process of claim 1 wherein the resinifiable mix comprises:
   (1) about 70 to about 99.5 parts per 100 parts by weight of resinifiable mix of a monovinyl aromatic compound;
   (2) about 0.5 to about 10 parts per 100 parts by weight of resinifiable mix of a polyolefinic crosslinking compound;

(3) about 0 to about 15 parts per 100 parts by weight of resinifiable mix of a rubbery polymer; and (4) about 0.1 to about 5.0 parts per 100 parts by weight of resinifiable mix of a free radical initiator.

10. The product of claim 1.

11. A method for improving the surface and physical condition of a laminate prepared from a thermosetting resinifiable mix whose cure is air-inhibited which comprises superimposing a layer of thermosetitng polyester resin on the surface of a layer of thermosetting vinyl aromatic resinifiable mix and causing the two layers to cure while in contact with one another.

12. The product of claim 11.

References Cited

UNITED STATES PATENTS

| | | | |
|---|---|---|---|
| 2,320,536 | 6/1943 | Pollack et al. | 117—138.8 X |
| 3,135,625 | 6/1964 | Ingrassia | 117—62.2 |
| 3,301,739 | 1/1967 | Vanderbilt | 161—204 X |

WILLIAM D. MARTIN, Primary Examiner

J. E. MILLER, Assistant Examiner

U.S. Cl. X.R.

117—138.8, 161